US 7,644,369 B2

(12) United States Patent
Hoe-Richardson (10) Patent No.: US 7,644,369 B2
(45) Date of Patent: Jan. 5, 2010

(54) CONTROLLING DISPLAY SCREEN LEGIBILITY

(75) Inventor: Peter Hoe-Richardson, Chestnut Hill, MA (US)

(73) Assignee: Rocket Software, Inc., Newton, MA (US)

( * ) Notice: Subject to any disclaimer, the term of this patent is extended or adjusted under 35 U.S.C. 154(b) by 379 days.

(21) Appl. No.: 11/155,395

(22) Filed: Jun. 17, 2005

(65) Prior Publication Data

US 2005/0235217 A1  Oct. 20, 2005

Related U.S. Application Data

(63) Continuation-in-part of application No. 10/882,552, filed on Jul. 1, 2004, now abandoned.

(60) Provisional application No. 60/554,889, filed on Mar. 19, 2004.

(51) Int. Cl.
 *G06F 13/00* (2006.01)
 *G06F 15/00* (2006.01)
(52) U.S. Cl. .................................. 715/768; 715/778
(58) Field of Classification Search ................ 715/768, 715/743, 744, 803, 790, 853, 763–765, 700, 715/715, 840, 778
See application file for complete search history.

(56) References Cited

U.S. PATENT DOCUMENTS

| | | | |
|---|---|---|---|
| 4,529,268 A | 7/1985 | Brown | 350/276 R |
| 4,712,870 A | 12/1987 | Robinson et al. | 350/243 |
| 4,812,709 A | 3/1989 | Dudasik | 313/478 |
| 4,868,765 A | 9/1989 | Diefendorff | 364/521 |
| 5,109,219 A | 4/1992 | Kastan et al. | 340/765 |
| 5,250,937 A | 10/1993 | Kikuo et al. | 345/89 |
| 5,386,505 A | 1/1995 | Beattie et al. | 395/158 |
| 5,467,441 A | 11/1995 | Stone et al. | 395/133 |
| 5,528,319 A | 6/1996 | Austin | 348/835 |
| 5,858,139 A | 1/1999 | Ouderkirk et al. | 156/60 |
| 5,892,511 A * | 4/1999 | Gelsinger et al. | 715/794 |
| 5,949,432 A | 9/1999 | Gough et al. | 345/435 |
| 6,012,073 A | 1/2000 | Arend et al. | 707/526 |
| 6,072,489 A | 6/2000 | Gough et al. | 345/345 |
| 6,072,501 A | 6/2000 | Bier | 345/433 |
| 6,211,930 B1 | 4/2001 | Sautter et al. | 349/66 |
| 6,246,407 B1 | 6/2001 | Wilks et al. | 345/343 |
| 6,252,595 B1 | 6/2001 | Birmingham et al. | 345/343 |
| 6,262,843 B1 | 7/2001 | Marx | 359/501 |
| 6,308,273 B1 | 10/2001 | Goertzel et al. | 713/201 |
| 6,313,878 B1 | 11/2001 | Jankowiak | 348/377 |
| 6,317,739 B1 | 11/2001 | Hirata et al. | 707/4 |

(Continued)

OTHER PUBLICATIONS

Michael Halle, "Autosteroscopic displays and computer graphics," Surgical Planning Laboratory, Department of Radiology, Brigham and Women's Hospital, pp. 1-6 (1997).

(Continued)

*Primary Examiner*—Cao (Kevin) Nguyen
(74) *Attorney, Agent, or Firm*—Proskauer Rose LLP (57) ABSTRACT

Computer screen legibility is controlled. A logically topmost software window of a particular color and of a certain transparency is created. Additionally, a pattern is used to further control legibility. The window allows screen objects logically beneath it on a z-axis to be viewed and manipulated and the window reduces a contrast of screen objects logically beneath it on the z-axis.

21 Claims, 9 Drawing Sheets

U.S. PATENT DOCUMENTS

| | | | | |
|---|---|---|---|---|
| 6,333,753 | B1 | 12/2001 | Hinckley | 345/768 |
| 6,353,499 | B2 | 3/2002 | Zanoni et al. | 359/341.32 |
| 6,369,919 | B1 | 4/2002 | Drinkwater et al. | 359/2 |
| 6,421,065 | B1 | 7/2002 | Walden et al. | 345/712 |
| 6,445,434 | B2 | 9/2002 | Takato et al. | 349/123 |
| 6,476,831 | B1 | 11/2002 | Wirth et al. | 345/784 |
| 6,529,209 | B1 | 3/2003 | Dunn et al. | 345/629 |
| 6,621,533 | B2 | 9/2003 | Slack et al. | |
| 6,784,905 | B2 * | 8/2004 | Brown et al. | 715/865 |
| 6,876,369 | B2 | 4/2005 | Brown et al. | 345/768 |
| 6,940,492 | B2 | 9/2005 | Maritzen et al. | 345/173 |
| 7,164,779 | B2 | 1/2007 | Yerazuis et al. | 382/100 |
| 7,176,850 | B1 * | 2/2007 | Itoh et al. | 345/9 |
| 2001/0026248 | A1 * | 10/2001 | Goren et al. | 345/7 |
| 2002/0096985 | A1 | 7/2002 | Hazzard | 313/112 |
| 2002/0154141 | A1 | 10/2002 | Forman | 345/626 |
| 2003/0118183 | A1 | 6/2003 | Struyk | 380/213 |
| 2003/0133569 | A1 | 7/2003 | Stern et al. | 380/206 |
| 2003/0137626 | A1 | 7/2003 | Khazova et al. | |
| 2004/0012671 | A1 | 1/2004 | Jones et al. | |
| 2004/0058150 | A1 | 3/2004 | Geddes et al. | |
| 2004/0119896 | A1 | 6/2004 | Kean et al. | |
| 2005/0094362 | A1 | 5/2005 | Stephens | 361/681 |
| 2005/0149726 | A1 | 7/2005 | Joshi et al. | 713/164 |
| 2005/0210400 | A1 | 9/2005 | Hoe-Richardson | 715/768 |
| 2006/0044290 | A1 | 3/2006 | Hurwitz et al. | 345/204 |
| 2006/0129948 | A1 | 6/2006 | Hamzy et al. | 715/790 |
| 2006/0181688 | A1 | 8/2006 | Hoshino et al. | 353/122 |
| 2006/0195802 | A1 | 8/2006 | Nakayama | 715/867 |
| 2006/0221067 | A1 | 10/2006 | Kim et al. | 345/204 |
| 2006/0259873 | A1 | 11/2006 | Mister | 715/781 |

OTHER PUBLICATIONS

Mitsushiro Koden, "Wide Viewing Angle Technologies of TFT-LCDs," Ecological Technology Development Center Corporate Research and Development Group, pp. 1-6, (May 14, 1999).

3M Filter Selection Guide product overview, 2 pages (Oct. 4, 2000).

P. A. Howart et al., "VISERG Report 9608: Evaluation of LapTop Computer Screens," Visual Ergonomics Research Group (VISERG), available at http://www.lboro.ac.uk/departments/hu/groups/viserg/9608osys.htm, pp. 1-8 (last visited Feb. 8, 2004).

3M Ergonomics for a More Productive and Comfortable Workspace product overview, available at www.3M.com/ergonomics, pp. 1-22, (last visited Feb. 7, 2004).

Transparent Windows—funny software product overview, available at http://web.archive.org/web/20030625121038/http://www.nccsoft.net/, p. 1, (last visited Jan. 9, 2004).

3M Office Ergonomics: 3M™ Computer Filters product overview, available at http://products3.3m.com/catalog/us/en001/office/computer_workstation/node_GSLJK3Q26..., pp.1-2. (last visited Feb. 7, 2004).

X-bit labs—Hardware news—Sharp Touts World's First 3D TFT Displays product overview, available at http://www.xbitlabs.com/news/other/display/20040810075526.html, pp. 1-3 (last visited Aug. 19, 2004).

* cited by examiner

CONTROLLING DISPLAY SCREEN LEGIBILITY

CROSS-REFERENCE TO RELATED APPLICATIONS

This application is a Continuation-In-Part of U.S. Utility patent application Ser. No. 10/882,552 entitled "Controlling Display Screen Legibility," filed Jul. 1, 2004, which claims the benefit of, and priority to, U.S. Provisional Patent Application Ser. No. 60/554,889, filed Mar. 19, 2004, the disclosures of both of which are hereby incorporated by reference in their entirety.

FIELD OF THE INVENTION

The invention relates to controlling display screen legibility.

BACKGROUND INFORMATION

In today's mobile information technology environment (e.g., computing or consumer electronics environment), individuals need to guard their privacy against information thieves, hackers, and even just the curious snoop passing by. No longer are address books left at home, or company secrets stored in a drawer at the office; they are carried with the individual as they move from home to work and to all points in-between. Various methods, from file level encryption to power-on passwords, have been employed to secure documents stored on laptop computers. Little is available, however, to protect the mobile user from visual "eavesdropping." Oftentimes employees find themselves checking e-mail or working in common areas such as airports or coffee shops. In these areas, passers-by or people at the next table may have a clear view of an employee's screen. Depending on various factors such as available light and the angle of view, an unprotected laptop screen may be readable, unbeknownst to the employee, from the side or from over her shoulder, even up to several feet away.

Companies such as 3M sell physical filters that are placed over a computer screen to prevent unwanted viewing. These screens filter out light that is emanating at an angle and only allow out light that is emanating perpendicular to the plane of the screen. The 3M screen in particular utilizes a technology similar to venetian blinds to prevent errant light from escaping at an undesired angle. Therefore, the light representing what is on the screen does not emit at a non-perpendicular angle and is not easily viewed from the side. While this helps prevent others from viewing screen content off-center, it does not solve the problem of unintended viewing from a direct orientation at a distance. Physical screens also require the employee to lug around another piece of hardware and place the onus of implementing security on the user. If the employee finds the device cumbersome or clumsy, the likelihood that it will be used, and used consistently, is diminished.

Applications such as WinAmp and Actual Transparent Windows by Actual Tools utilize transparent application window functionality to allow a user to view applications beneath the window of the topmost application window.

SUMMARY OF THE INVENTION

In accordance with at least one aspect of the invention, screen obscurity that is easy-to-use and hard to defeat is provided. The limitations of physical screens are avoided while a satisfactory screen obfuscation is provided with respect to multiple viewing angles and distances.

In accordance with at least one embodiment of the present invention, a method of controlling computer screen legibility is provided. The method includes creating a logically topmost software window. The window includes pattern, transparency, and a z-axis orientation attributes. The method further includes allowing a screen object, which has a z-axis orientation that is less than the z-axis orientation of the logically topmost software window, to be viewed and manipulated. The pattern and/or the transparency of the logically topmost software window reduces a contrast of the screen object.

The logically topmost software window further includes a height and a width attribute. In some implementations, the method further includes determining a second height and a second width of a display screen in which the logically topmost software window is viewed. In some implementations, the methods further includes changing the first height to equal the second height and/or changing the first width to equal the second width. This effectively covers the entire display area of the display screen. Alternatively, the method may include changing the first height to be less than the second height and/or changing the first width to be less than the second width. This creates a logically topmost software window for only part of the display screen area.

In another aspect, there is a method of controlling display screen legibility that includes creating a logically topmost software window that has a pattern, a transparency, and a z-axis orientation. The method also includes allowing a screen object that has a z-axis orientation, the z-axis orientation of the screen object being less than the z-axis orientation of the logically topmost software window, to be viewed and manipulated. The pattern and the transparency of the logically topmost software window reduces a contrast of the screen object.

In another aspect, there is a means for controlling display screen legibility. The means includes a means for creating a logically topmost software window comprising a pattern, a transparency, and a z-axis orientation. Additionally the means for controlling display screen legibility also includes means for allowing a screen object that has a z-axis orientation, the z-axis orientation being less than the z-axis orientation of the logically topmost software window, to be viewed and manipulated. The pattern or the transparency of the logically topmost software window reduces a contrast of the screen object.

In another aspect, there is a computer-readable storage medium containing a set of instructions for a general purpose computer having a user interface comprising a screen display, the set of instructions being operative to cause the general purpose computer to create a logically topmost software window that has a pattern, a transparency, and a z-axis orientation. The instructions are further operable to cause the general purpose computer to allow a screen object that has a z-axis orientation, the z-axis orientation of the screen object being less than the z-axis orientation of the logically topmost software window, to be viewed and manipulated. At least one of the pattern or the transparency of the logically topmost software window reduces a contrast of the screen object.

In another aspect there is a system for controlling legibility of a display screen. The system includes software that provides a graphical user interface to a user via the display screen and software that creates a window, the window overlaying the graphical user interface. The window includes at least one of a transparency or a pattern, and the window reduces a contrast of the graphical user interface for a person with an undesired orientation to the display screen.

In any of the implementations described above, the pattern may be one or more of, but is not limited to, the following: a wavy line, a pair of wavy lines, a color different than the color of the screen object, a swapping of the screen object's color and the text color, a crescent, a pair of crescents, a sinusoidal waveform, a modulated sinusoidal waveform, a grid, or any combination thereof. In some implementations, the pattern is repeated horizontally across the window. In other implementations, the pattern is repeated vertically across the window. In still other implementations, the pattern is displayed diagonally, or is repeated in a manner that is a combination of horizontal and vertical repetitions.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims. Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other features and advantages of the present invention, as well as the invention itself, will be more fully understood from the following description of various embodiments, when read together with the accompanying drawings, in which.

DETAILED DESCRIPTION

Computer screens have a readability limit known as "fall off" due to the method employed by the screen to display data. The fall off of a liquid crystal display (LCD) is typically higher than that of a CRT. This is due to the angle the liquid crystals align to when emitting light. The light emitted from a LCD is projected in a plane generally perpendicular to the screen. When viewed from the side, laptop screens are typically harder to read than CRTs because less light is being directed to an angled viewer. With less light being directed to the angled viewer, the need for a large contrast between background and foreground data is increased when attempting to maintain readability. At least one embodiment of the present invention takes advantage of this concept in that it decreases the contrast between foreground data and background, dramatically making the screen harder to read, especially from the side.

The contrast between light and dark is what enables a user to discern words or images from background colors. For example, black letters on a white page have a high contrast and are thus very readable. Narrowing the contrast gap between data and background amplifies a computer screen's fall off. This limits the ability of a third-party to make out what is on the screen. For example, dark gray letters on a light gray background are harder to read than black letters on a white background. An embodiment of the invention applies a contrast filter to the desktop (on the computer screen) of the computer user. By logically overlaying a red filter over a black-text-on-white-background embodiment, the difference in contrast between white, e.g., now light red, and black, e.g., now dark red, is diminished. The lowering of the screen's contrast causes the screen's readability to fall off dramatically when the screen is viewed from the side, e.g., by a third party. In addition, readability from a distance is reduced because as distance from the screen is increased, the two colors, e.g., light red and dark red, visually blend together. In addition to colors, patterns may be used as well. For example, the screen may have portions of greater and lesser contrast because a wave pattern is used in conjunction with the color selected. Alternatively, the pattern may be a wavy line, a pair of wavy lines, a swapping of the screen object's color and the text color, a crescent, a pair of crescents, a sinusoidal waveform, a modulated sinusoidal waveform, a grid, a color different than the color of the filter, e.g., the pattern is portions of red color and orange color (in, for example, a pattern as described above), or any combination thereof. The pattern may be repeated horizontally, vertically, or a combination of both. Greater obscurity is obtained when the pattern flows in the same orientation, e.g., horizontally, as the underlying text. Additionally, it is beneficial to produce a pattern that is approximately the same height as the underlying text, e.g., 9 to 11 points.

Figure 1:
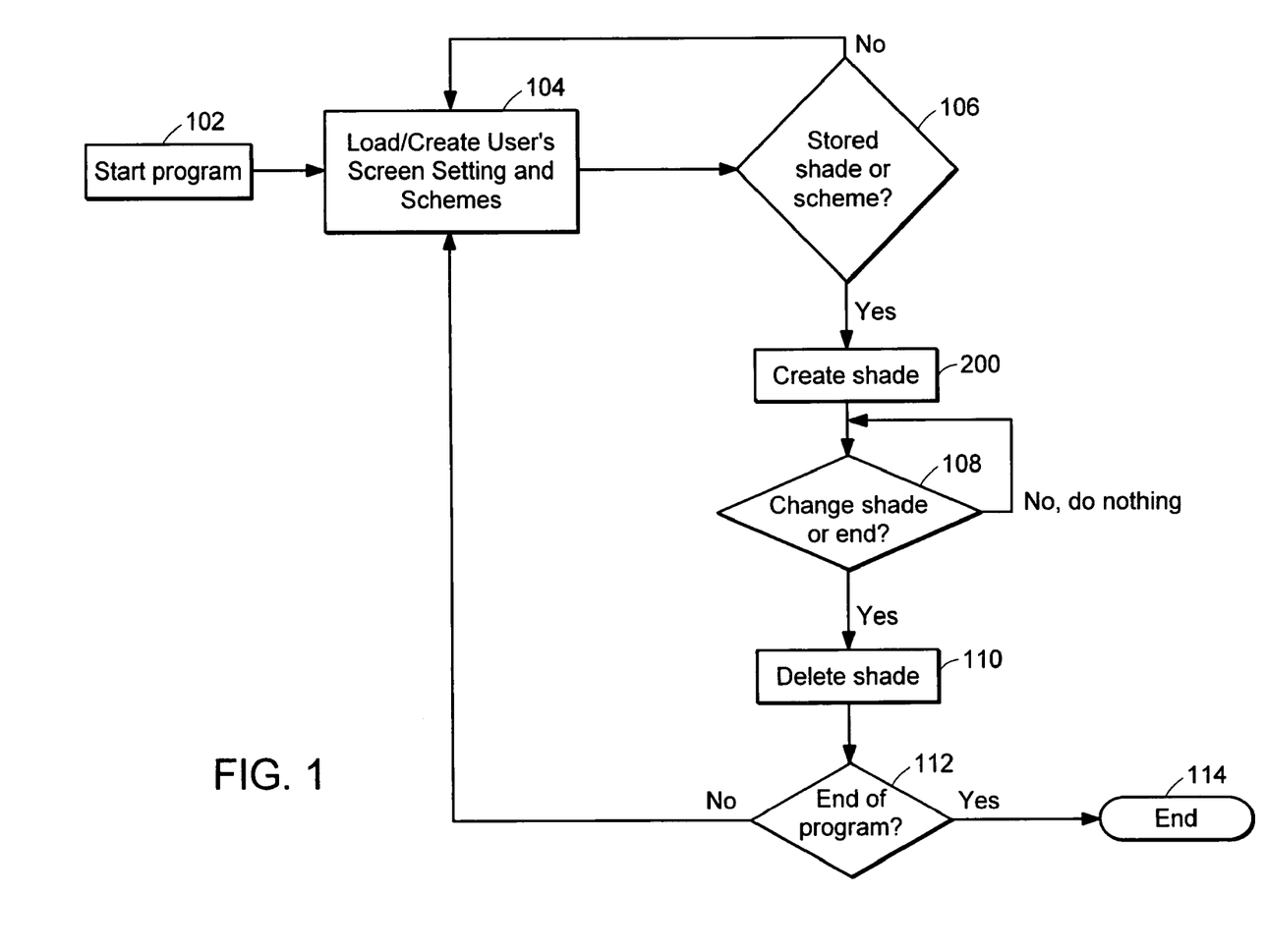
FIG. 1 is a flowchart depicting a program for allowing a user to create a semi-opaque, patterned, colorized filter for a computer screen using only software in accordance with an embodiment of the invention.

FIG. 1 illustrates an embodiment of the lifecycle of the method. The program is started (step 102) and user preferences are found (step 104), e.g., by being loaded from the program's settings, from default values, from a scheme provided by the user (step 106), or defined interactively through direct user input (step 104). Once the program is finished reading and inputting user preferences, it creates the filter window ("shade") described in FIG. 2 (step 200). While the user continues to use the existing shade, the program waits for new input (step 108). This waiting does not prevent the user from interacting with other applications or aspects of the operating system or computer. Once the user decides to change an aspect of the shade or end the program (step 108), the program deletes the current shade (step 110). If the user is ending the program (step 112), the program is terminated and the application ends (step 114). In the event of a non-program-terminating change, the method returns to the preference-determining step (step 104) and the cycle is repeated. Upon program shutdown (step 114), the user is able to view the computer screen as normal.

Figure 2:
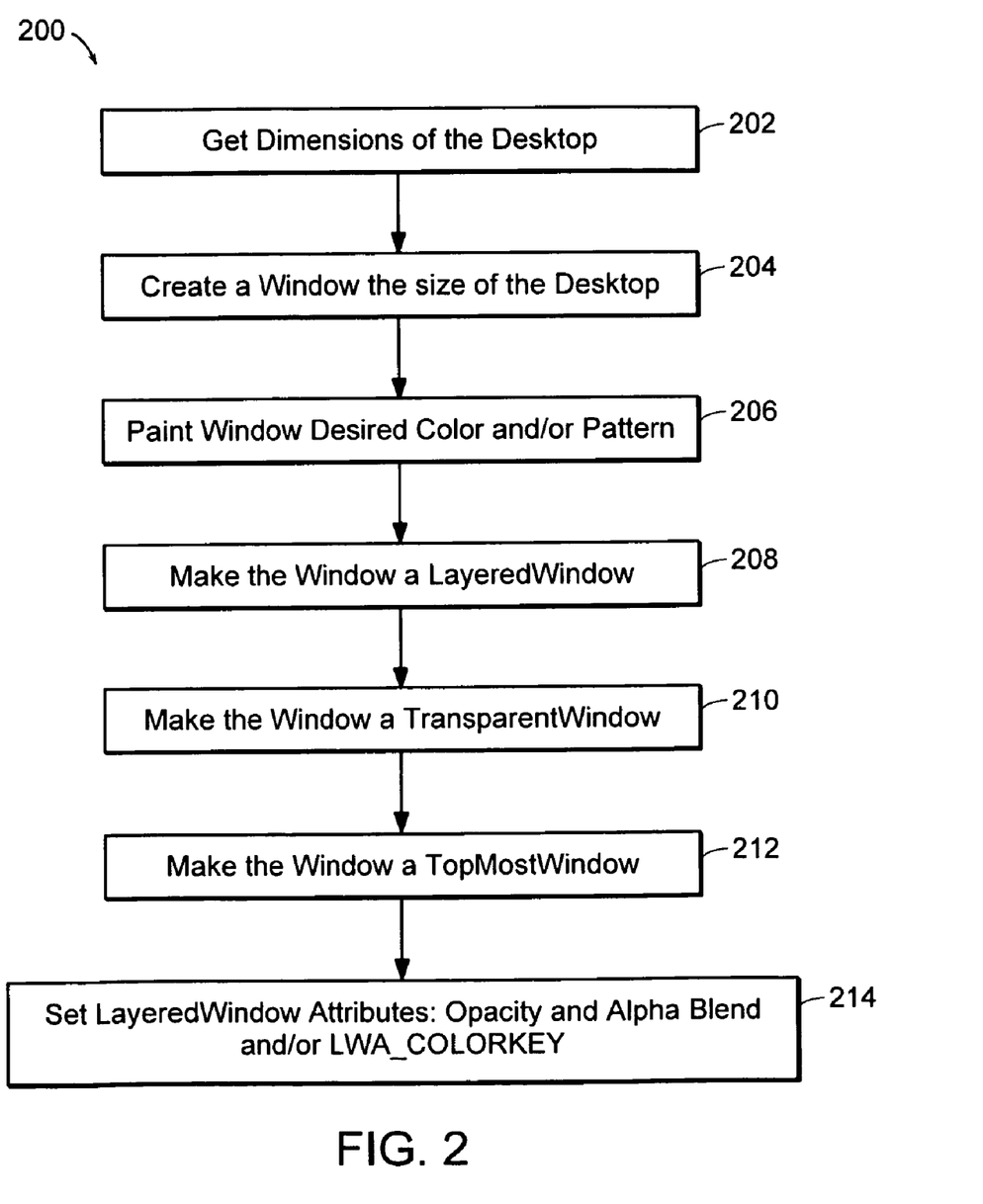
FIG. 2 is a flowchart depicting a method for instantiating a colorized, patterned, semi-opaque shade on a computer screen in accordance with an embodiment of the invention.

As illustrated in FIG. 2, in at least one implementation, shade creation (FIG. 1, step 200), and thus contrast reduction, is accomplished through a series of sequential steps. In other embodiments, one or more of the steps may be executed in parallel, in a different order, or together with other steps. By use of an aspect of the Windows Application Programming Interface (API), e.g., in at least one embodiment a call to the SystemParametersInfo( ) routine, the size of the user's desktop is calculated (step 202) and a shade is created in accordance with the desktop size (step 204). Though a typical application window covers "available" space on a desktop, this does not usually encompass space used by taskbars and system trays. At least one embodiment of the present invention provides a shade that covers the entire desktop including taskbars and system trays via calculating the screen size and then adding an amount to the calculated window height. In at least one embodiment, the amount is 100 pixels. In other embodiments, only part of the screen is obfuscated, an amount to be determined by the user at runtime (e.g., through an application setting or by changing the shade window size).

In the method, the shade is "painted" using a brush attribute. In some embodiments, the brush is a specified color (step 206). In at least one embodiment, the shade uses the Windows API FillRect (rectangle, brush) method call to accomplish this, wherein the brush is a Windows API object that has the specified color as an attribute. The color may be specified through a default value, a pre-defined scheme provided by the user or interactively through direct or indirect user input (FIG. 1, steps 104, 106). In some embodiments the brush, in addition to a color, also includes a BitMapPattern. In those embodiments, not only is a color applied to the shade, the brush additionally paints the BitMapPattern on the shade. The BitMapPattern is typically a pattern that has two or more colored aspects. A first colored aspect forms the pattern seen by a viewer and a second colored aspect represents the portions of the pattern that will be transparent (described below). The shade is then instructed to become a LayeredWindow (step 208). In at least one embodiment, making the shade a LayeredWindow is accomplished by calling the Windows API method SetWindowLong( ) method and passing in the following parameters: the shade window, a parameter indicating an extended window style will be set, and the "Layered" attribute i.e., WS_EX_LAYERED. The shade being a LayeredWindow allows other application windows and screen objects beneath the shade, such as the task bar, to be viewed, even though the shade may be on top of them. The shade is then instructed to additionally become a TransparentWindow (step 210). Similar to the setting of the LayeredWindow attribute, the shade window is made transparent in at least one embodiment by calling the SetWindowLong( ) method. The first two parameters are the same as previously described, e.g., the shade window and an attribute indicating an extended window style is being set, but in this instance, the third parameter indicates the style to be applied is "Transparent," i.e., WS_EX_TRANSPARENT. The TransparentWindow allows the shade to pass mouse, keyboard, and other user input to applications beneath the shade ("beneath" is in relation to the shade's z-axis orientation: the higher the z-axis value, the fewer the number of other application windows that are "on top" of the shade).

The shade is then instructed that it is the TopMostWindow (step 212). In at least one embodiment this is accomplished by passing in the extended window style WS_EX_TOPMOST to the window creation method, i.e., CWnd::CreateEx( ). This forces all other application windows to reside beneath the shade. In some embodiments, the shade periodically polls the system to determine if it is still topmost. If at any regular point in time it is not, it instructs itself to be so. In other embodiments, any time another application window becomes topmost, the shade immediately or eventually becomes topmost in response. The application still receives user input, but is beneath the shade. In embodiments where just a color is painted on the shade, the shade is then instructed of the shade's opacity and alpha blend values (step 214). In embodiments where a pattern is applied to the shade, the shade is instructed to make particular areas of the BitMapPattern transparent by passing a LWA_COLORKEY variable as a parameter when setting (step 214) LayeredWindow attributes. The LWA_COLORKEY parameter is a color reference, e.g., "white". The color described by the LWA_COLORKEY variable indicates that the shade is to render the color aspects of the BitMapPattern that match that color as transparent. For example, in a shade with a crescent pattern, the pattern may consist of red crescents against a white background. When creating the shade, the LWA_COLORKEY variable is passed as "white". Therefore the shade will be painted using the BitMapPattern of red crescents against a white background, the white background then being rendered transparent because "white" is the value of LWA_COLORKEY. The shade's opacity, alpha blend, and LWA_COLORKEY values may be specified through default values, a pre-defined scheme provided by the user, or interactively through direct user input. Additionally, in some embodiments, the API calls may be combined or executed in an order different than listed above.

Figure 3:
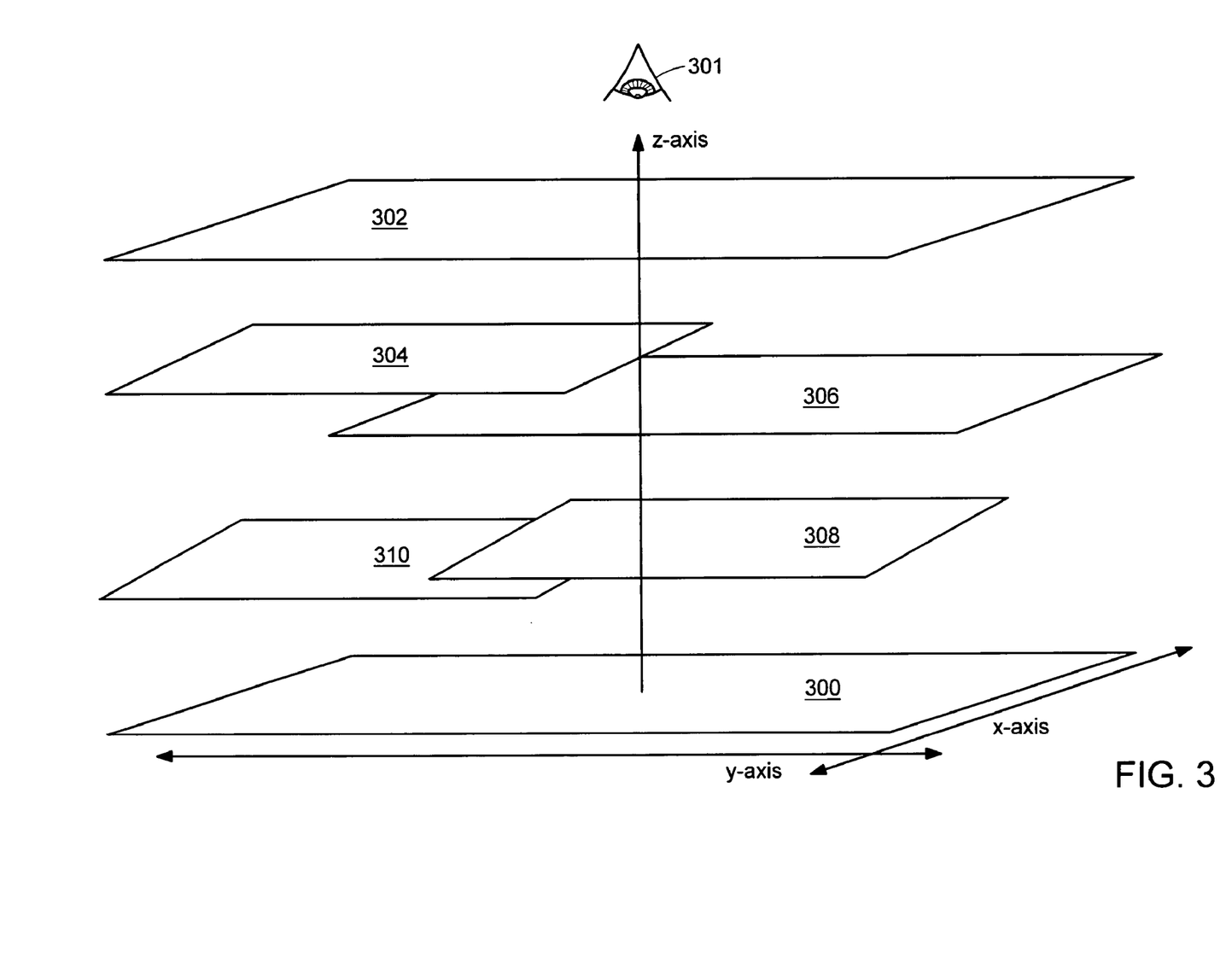
FIG. 3 is an illustration of a side view of application windows logically layered on a desktop with an embodiment of the invention generally topmost on the z-axis.

FIG. 3 illustrates the layering of application windows on a "shaded" desktop. The z-axis provided illustrates a positional relationship between the desktop 300 and the user 301. The desktop 300 can be considered to have a z-axis value of zero and the user 301 can be considered to have an infinite z-axis value. Between the two extremes are layers wherein application windows reside, an application with a higher z-axis value being considered closer to the user 301 or "on top" of other applications. In FIG. 3, the shade 302 has a higher z-axis value than the other application windows 304, 306, 308, 310, on the desktop 300. The natural behavior is for an application window, for example 306, to become topmost when it is focused on, e.g., a mouse button is clicked within the xy boundaries of the application window, provided no window (other than the shade) has a higher z-axis value for those xy coordinates. Upon focus, the window's 306 z-axis value normally would be set to the highest of all the windows and it would occupy a z-axis level above them, including the shade 302. However, the shade, through methods described above, maintains its topmost attribute; thus, even if 306 is focused on, at best it may "rise" to a level between the shade 302 and the second highest application window 304.

Figure 4:
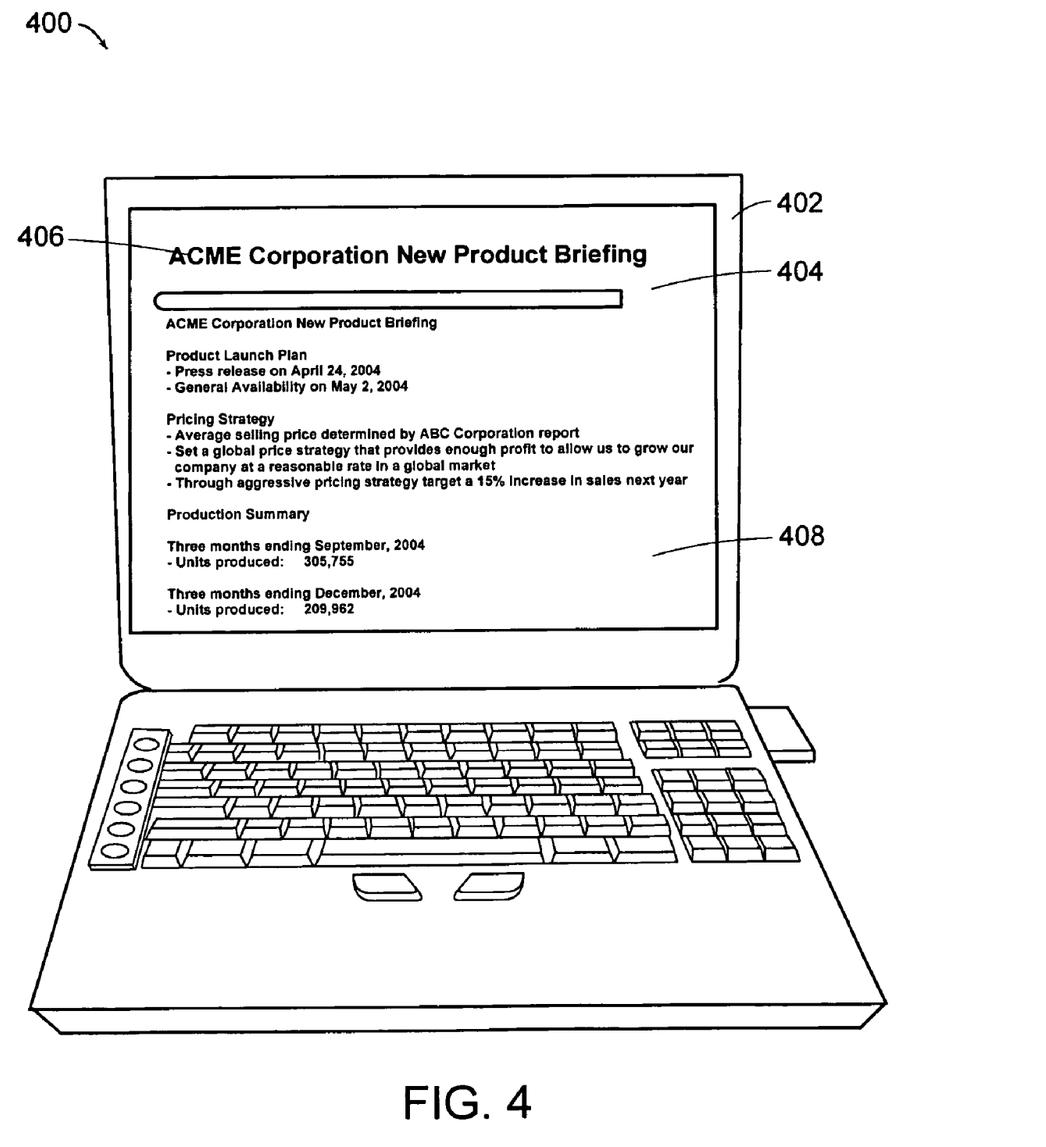
FIG. 4 is an illustration of a laptop computer viewed from the front while an embodiment of the present invention is not running.
Figure 5:
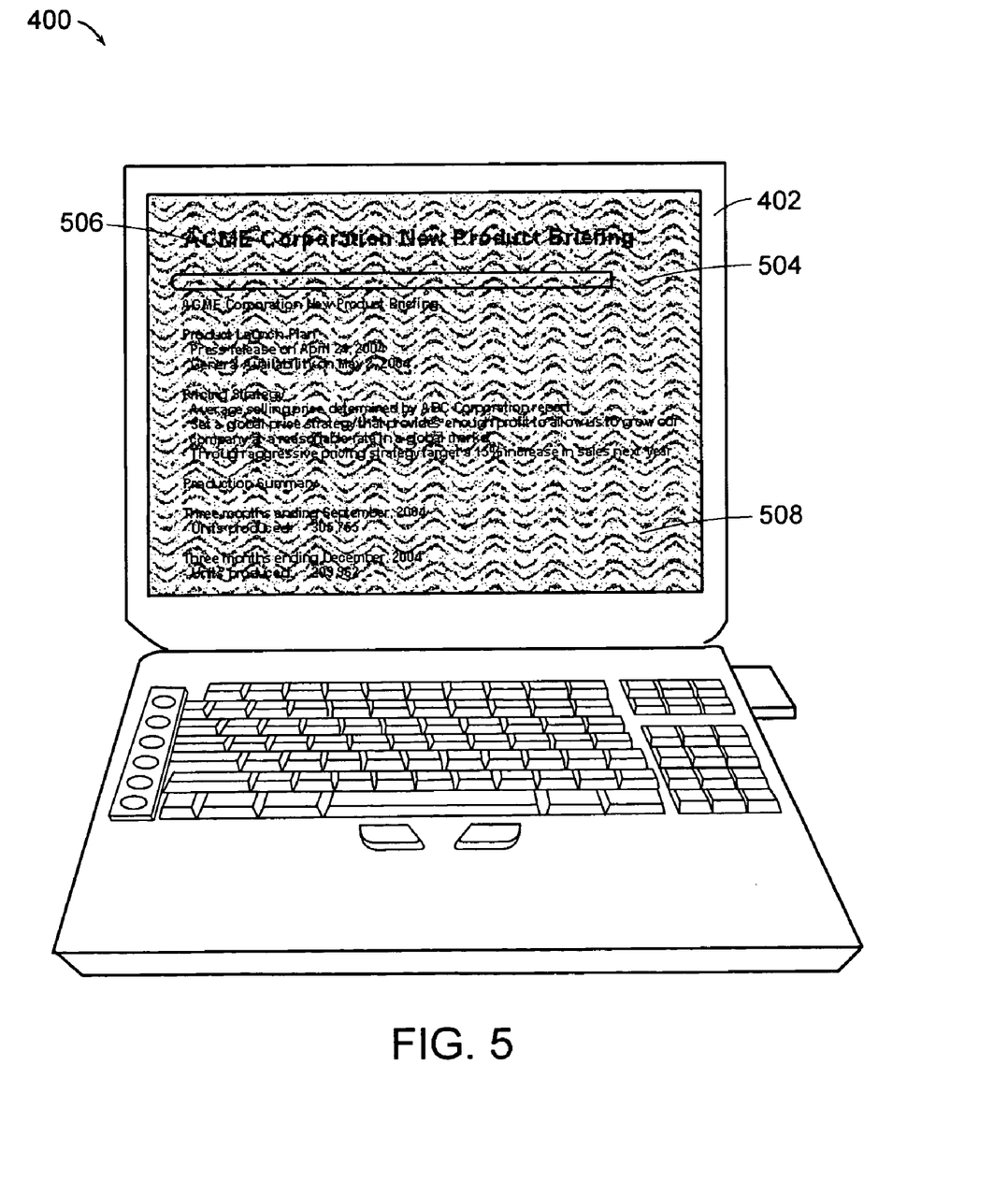
FIG. 5 is an illustration of the laptop computer of FIG. 4 viewed from the front while an embodiment of the present invention is running.
Figure 6:
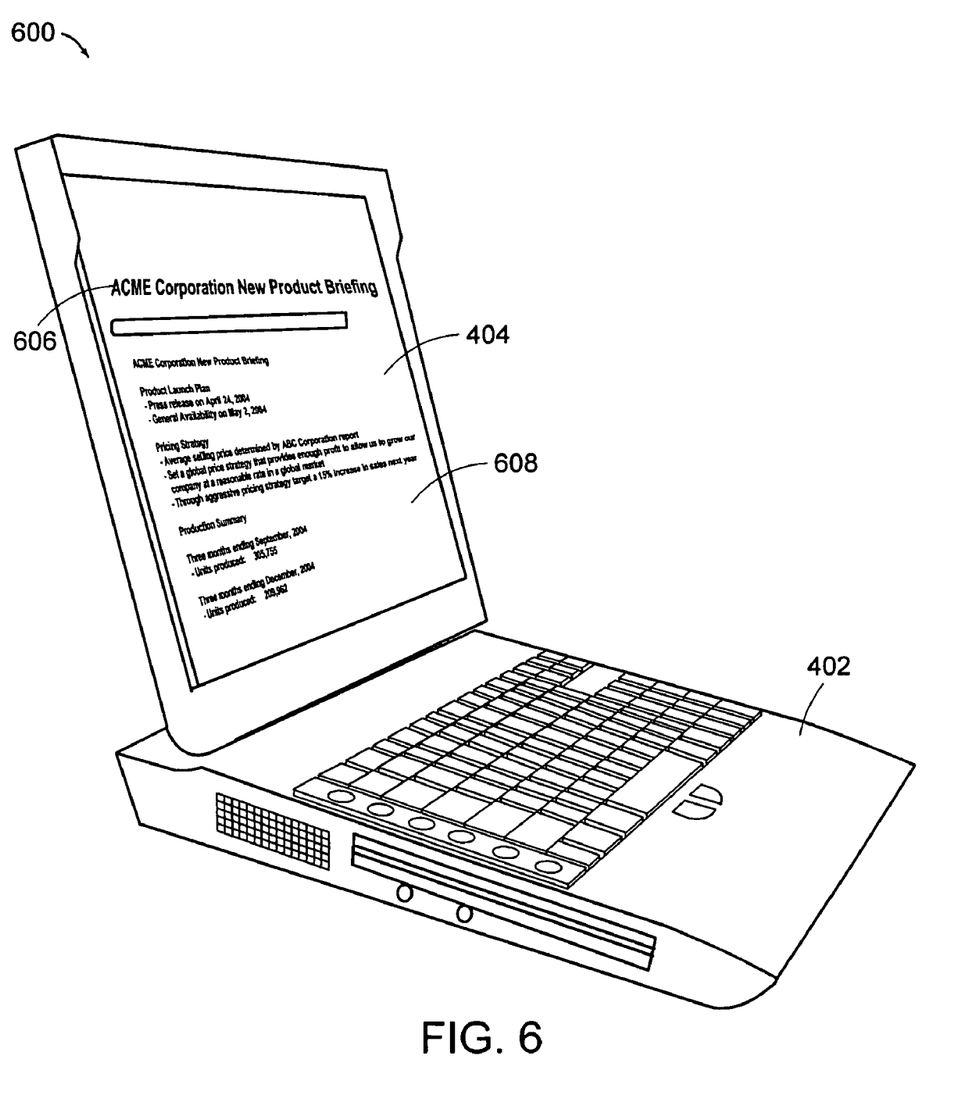
FIG. 6 is an illustration of the laptop computer of FIG. 4 viewed from an angle while an embodiment of the present invention is not running.
Figure 7:
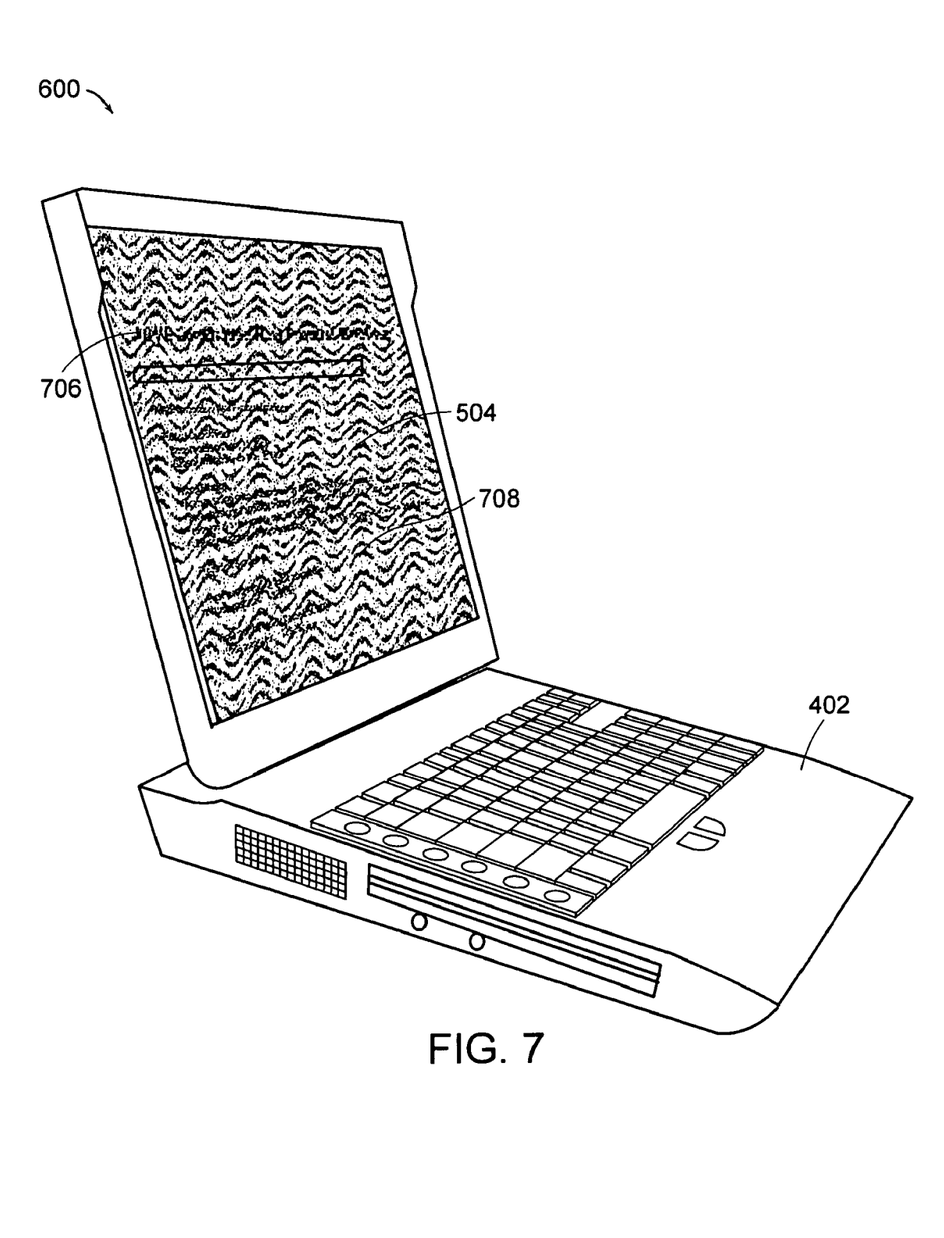
FIG. 7 is an illustration of the laptop computer of FIG. 4 viewed from an angle while an embodiment of the present invention is running.

Once the shade is created, the user interacts normally with the computer. FIGS. 4 through 9 demonstrate aspects of the invention. FIG. 4 illustrates a direct orientation 400 with respect to a computer 402, depicting a normal screen 404 (i.e., without a shade being applied). There is a distinguishable contrast between the text 406 and the background 408. FIG. 5 illustrates the same direct orientation 400 with respect to the computer 402 of FIG. 4 but with a shaded screen 504 (i.e., with a shade applied in accordance with one embodiment of the invention). Note that little legibility is lost when viewed at a distance from which a normal user would view the laptop, though a slight reduction in contrast is noticeable between the text 506 and the background 508 (i.e., the screen in FIG. 4 appears "brighter" than the screen with the shade applied in FIG. 5). FIG. 6 is a side view 600 of the computer 402 and screen 404 of FIG. 4, wherein the shade is not running and again, a distinguishable contrast is found between the text 606 and the background 608. FIG. 7 is the same side view 600 as FIG. 6, but now the computer 402 has a shaded screen 504 with the shade applied in accordance with one embodiment of the invention. Note that the screen content, e.g., text 706 and background 708, is obfuscated significantly.

Because the user in direct orientation 400 with the computer screen views the screen as depicted in FIG. 5, input intended for other applications is still able to be transmitted to the respective existing applications, and applications may be opened or closed. The only difference in user-computer interaction is, because all applications are behind the shade, that the user sees a slightly reduced contrast version of the screen when directly oriented at a normal distance (400 in FIGS. 4 and 5). However, when viewing from the side (side view 600 in FIGS. 6 and 7) a third-party observer generally sees a blur of the shade color (FIG. 7) because the contrast between text 706, or any displayed data for that matter, and background 708 has been narrowed. An observer with a direct orientation viewing from a distance sees a blur similar to that illustrated in FIG. 7 because the shade causes data and background to blend together as the distance between screen and observer increases.

Figure 8:
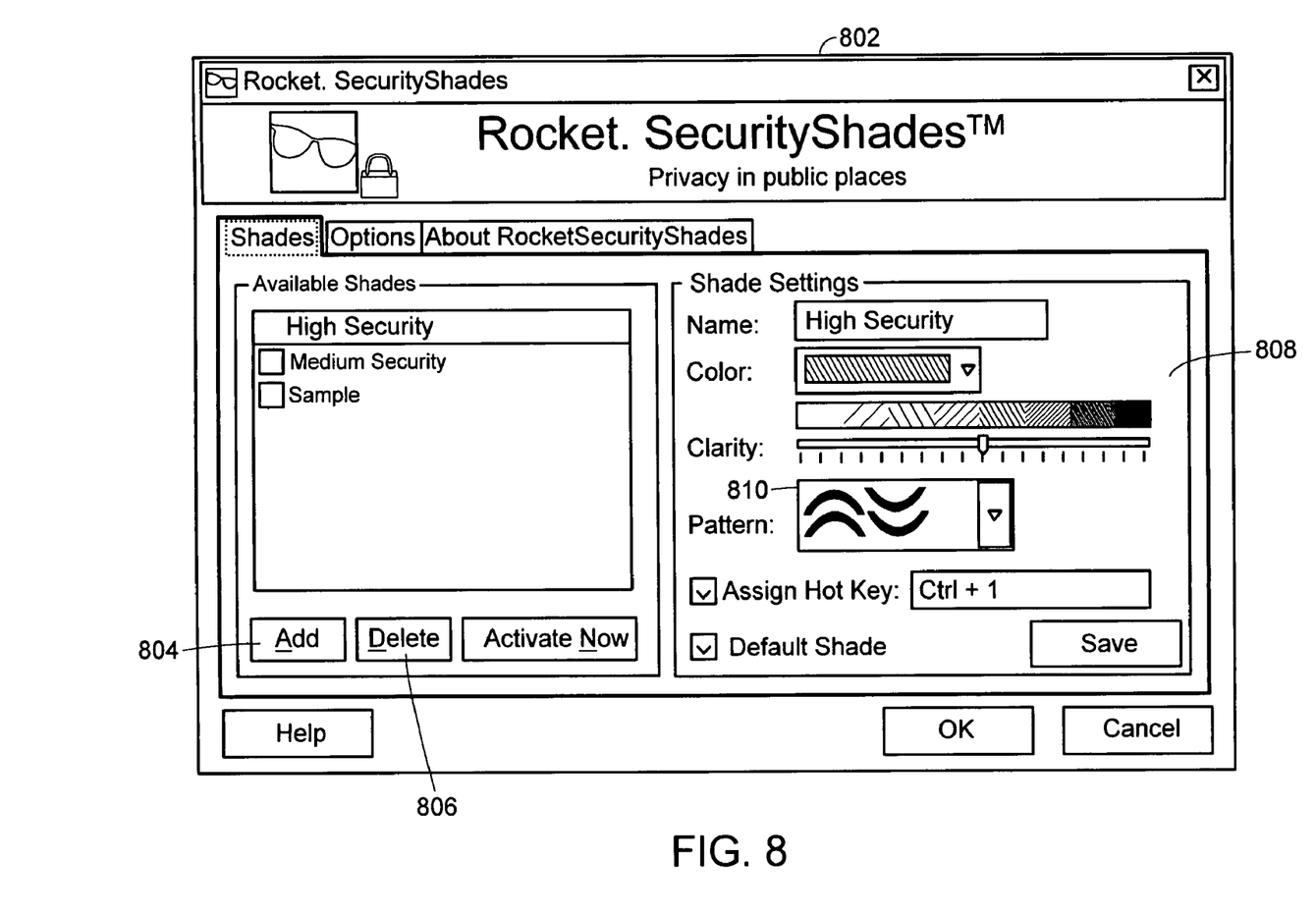
FIG. 8 is a view of a settings dialog in accordance with one embodiment of the present invention.

FIG. 8 is an exemplary picture of a Windows 2000 settings dialog box 802 where users can add 804, delete 806, and edit filter shade settings 808. Additionally, a pattern 810 to be applied to the shade is selectable.

Figure 9:
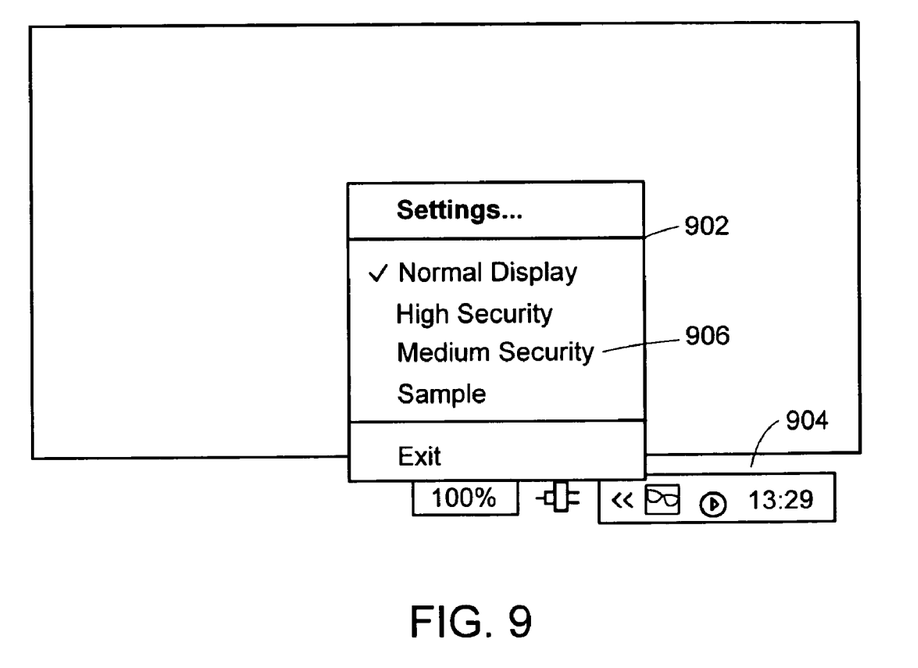
FIG. 9 is a view of a system tray menu running in an exemplary Windows 2000 environment.

FIG. 9 is an exemplary picture of one embodiment of the invention 902 running in a Windows 2000 system tray 904, allowing access to filter settings 906 without the need to access a menu on shade window.

Though Windows 2000 is used throughout as an example, it should be noted that alternate embodiments of the invention run on, but are not limited to, any Windows platform, e.g., Windows 95, Windows 98, Windows Me, Windows NT, Windows XP, Windows "Longhorn" or other derivations and embodiments of Microsoft's Windows-brand Operating System. Beneficially, embodiments of the present invention that also run on Macintosh platforms, e.g., OS 9 or OS X, or on Unix-like environment such as Linux, FreeBSD, NetBSD, or OpenBSD, are covered within the scope of the essential characteristics and spirit of the invention. Additionally, methods that access video card drivers to overlay the transparent, colorized shade or methods that involve passing messages, different than the examples provided in reference to Windows 2000, to the operating system to accomplish the shade are also contemplated and covered within the scope and spirit of the invention.

From the foregoing, it will be appreciated that the systems and methods provided by the invention afford protection from third-party viewing and overcome the cumbersome nature and disadvantages of physical screen filters.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method executed on a computer for making a display screen in communication with the computer more difficult to read from a side orientation and/or from a distance, the method comprising:

creating a logically topmost software window on the display screen comprising a transparency, a first z-axis orientation, and a pattern comprising: a wavy line, a color, a grid, and an alpha blend; and allowing a screen object on the display screen comprising a second z-axis orientation, the second z-axis orientation being less than the first z-axis orientation, to be viewed and manipulated;

wherein the pattern and the transparency reduce a legibility of the screen object on the display screen for a person viewing the display screen from the side and/or from a distance.

2. The method of claim 1 wherein the pattern is repeated horizontally across the window.

3. The method of claim 1 wherein the pattern is repeated vertically across the window.

4. The method of claim 1 wherein the pattern is repeated diagonally across the window.

5. The method of claim 1 wherein the window further comprises a first height and a first width.

6. The method of claim 5 further comprising determining a second height and a second width of a display screen in which the window is viewed.

7. The method of claim 6 further comprising changing the first height to equal the second height.

8. The method of claim 6 further comprising changing the first width to equal the second width.

9. The method of claim 6 further comprising changing the first height to be less than the second height.

10. The method of claim 6 further comprising changing the first width to be less than the second width.

11. The method of claim 1 wherein the screen object further comprises a text and the pattern is approximately the same height as the text.

12. The method of claim 1 wherein the screen object further comprises a text and the pattern has an orientation similar to an orientation of the text.

13. A computerized apparatus for making a display screen in communication with the apparatus more difficult to read from a side orientation and/or from a distance, the apparatus comprising:

means for creating a logically topmost software window on the display screen comprising a transparency, a first z-axis orientation, and a pattern comprising: a wavy line, a color, a grid, and an alpha blend; and means for allowing a screen object on the display screen comprising a second z-axis orientation, the second z-axis orientation being less than the first z-axis orientation, to be viewed and manipulated;

wherein the pattern and the transparency reduce a legibility of the screen object on the display screen for a person viewing the display screen from the side and/or from a distance.

14. A computer program product, tangibly embodied in a computer-readable storage medium containing a set of instructions for making a display screen for a general purpose computer having a user interface comprising a screen display more difficult to read from a side orientation and/or from a distance, the computer program product operable to cause a computer to:

create a logically topmost software window on the display screen comprising a transparency, a first z-axis orientation and pattern comprising: a wavy line, a color, a grid, and an alpha blend; and allow a screen object on the display screen comprising a second z-axis orientation, the second z-axis orientation being less than the first z-axis orientation, to be viewed and manipulated;

wherein the pattern reduces legibility of the screen object on the display screen for a person viewing the display screen from the side and/or from a distance.

15. The computer-readable storage medium of claim 14 wherein the pattern is repeated horizontally across the window.

16. The computer-readable storage medium of claim 14 wherein the pattern is repeated vertically across the window.

17. The computer-readable storage medium of claim 14 wherein the pattern is repeated diagonally across the window.

18. The computer-readable storage medium of claim 14 wherein the screen object further comprises a text and the pattern is approximately the same height as the text.

19. The computer-readable storage medium of claim 14 wherein the screen object further comprises a text and the pattern has an orientation similar to an orientation of the text.

20. A system for making a display screen more difficult to read from a side orientation and/or from a distance, the system comprising:
   the display screen;
   a computer;
   wherein the computer is configured to execute a first software that provides a graphical user interface to a user via the display screen; and
   the computer is further configured to execute a second software that creates a window comprising a transparency and a pattern comprising: a wavy line, a color, a grid, and an alpha blend;
   wherein the window overlaying the graphical user interface, wherein the window reduces the legibility of the graphical user interface for a person with an undesired orientation to the display screen.

21. A method executed on a computer for making a display screen in communication with the computer more difficult to read from a side orientation and/or from a distance, yet still readable without requiring a filter the method comprising:
   creating, by the computer, a logically topmost software window comprising a transparency, a first z-axis orientation, and a pattern consisting of: a wavy line, a color, and an alpha blend; and
   allowing, by the computer, a screen object on the display comprising a second z-axis orientation, the second z-axis orientation being less than the first z-axis orientation, to be viewed and manipulated;
   wherein the pattern and the transparency transform the display such that a legibility of the screen object on the display is reduced and therefore more difficult to read from a side orientation and/or from a distance.

* * * * *

UNITED STATES PATENT AND TRADEMARK OFFICE
CERTIFICATE OF CORRECTION

PATENT NO. : 7,644,369 B2
APPLICATION NO. : 11/155395
DATED : January 5, 2010
INVENTOR(S) : Peter Hoe-Richardson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this

Sixteenth Day of November, 2010

David J. Kappos
*Director of the United States Patent and Trademark Office*